(12) United States Patent
O'Carroll (10) Patent No.: US 9,946,737 B2
(45) Date of Patent: Apr. 17, 2018

(54) SYSTEM AND METHOD FOR SIMPLIFYING DATA ACCESS BETWEEN TIERS IN A MULTI-TIER SYSTEM

(75) Inventor: Luan O'Carroll, Dublin (IE)

(73) Assignee: Business Objects Software Ltd., Dublin (IE)

( * ) Notice: Subject to any disclaimer, the term of this patent is extended or adjusted under 35 U.S.C. 154(b) by 354 days.

(21) Appl. No.: 13/492,039

(22) Filed: Jun. 8, 2012

(65) Prior Publication Data

US 2013/0332486 A1    Dec. 12, 2013

(51) Int. Cl.
*G06F 17/30* (2006.01)

(52) U.S. Cl.
CPC .. *G06F 17/30303* (2013.01); *G06F 17/30371* (2013.01); *G06F 17/30525* (2013.01)

(58) Field of Classification Search
CPC ........ G06F 17/30303; G06F 17/30867; G06F 17/30902; G06F 17/30398; G06F 17/3041; G06F 17/30427; G06F 17/30997; G06F 17/3056; G06F 17/30569; G06F 17/30607; G06F 17/30362
USPC ................................................ 707/769, 774
See application file for complete search history.

(56) References Cited

U.S. PATENT DOCUMENTS

| | | | |
|---|---|---|---|
| 5,708,828 A * | 1/1998 | Coleman | G06F 17/30569 707/E17.006 |
| 7,313,575 B2 * | 12/2007 | Carr et al. | |
| 7,624,376 B1 * | 11/2009 | Katzer et al. | 717/121 |
| 8,229,402 B2 * | 7/2012 | Kretz | G06F 17/30067 455/414.1 |
| 2004/0249792 A1 * | 12/2004 | Halim | G06F 17/30067 |
| 2005/0027708 A1 * | 2/2005 | Mueller | G06F 17/30566 |
| 2006/0218174 A1 * | 9/2006 | Cook, III | G06F 9/4435 |
| 2008/0010381 A1 * | 1/2008 | Barraclough et al. | 709/228 |
| 2008/0104083 A1 * | 5/2008 | Woods | G06F 17/3007 |
| 2010/0049729 A1 * | 2/2010 | Black | 707/101 |
| 2010/0162204 A1 * | 6/2010 | Baumann et al. | 717/106 |
| 2011/0153465 A1 * | 6/2011 | Pombo et al. | 705/27.1 |
| 2012/0272337 A1 * | 10/2012 | Velasco | 726/28 |

* cited by examiner

*Primary Examiner* — James Trujillo
*Assistant Examiner* — Fariborz Khoshnoodi
(74) *Attorney, Agent, or Firm* — Schwegman Lundberg & Woessner, P.A.

(57) ABSTRACT

A system and method for simplifying data access between tiers in a multi-tier system is disclosed. In an embodiment, a method is provided for receiving a request for service from a browser at a generic data access object (GDAO) layer; generating, by use of a data processor, a single, shared, generic data transfer object (GDTO) at the GDAO layer; calling through to a database tier, the database tier providing database metadata; and using the database metadata to include result data in the GDTO and return the GDTO in response to the request.

20 Claims, 5 Drawing Sheets

SYSTEM AND METHOD FOR SIMPLIFYING DATA ACCESS BETWEEN TIERS IN A MULTI-TIER SYSTEM

FIELD

The present disclosure relates generally to data access. In an embodiment, the disclosure relates to simplifying data access between tiers in a multi-tier system.

BACKGROUND

In a traditional three tier architecture, the middle tier typically provides most of the business logic and therefore a semantically rich representation of the data model is often used. In contrast with an In-Memory Computing Engine (MICE), the business logic is provided on the same tier as the data persistency, and this leads to an architecture where the middle tier needs to provide reduced functionality. In most cases, the middle tier just marshals data to and from Hypertext Transfer Protocol (HTTP) requests and responses.

The traditional approach is well-served by tooling that generates intermediate representation of the data model as Data Transfer Objects (DTOs). The creation of these DTOs requires that some metadata is provided or that the DTOs are manually constructed. In either case, a large amount of code and code artifacts are created. Managing the metadata for these DTOs in an IMCE architecture typically involves duplicating metadata already present in the database. In addition, because dedicated DTOs are created, dedicated marshaling code is also required and this leads to undesirable greater overhead.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

In the example embodiments described herein, a system and method simplify data access between tiers in a multi-tier system. A Generic Data Transfer Object (GDTO) is constructed that leverages the metadata held in the database. The GDTOs can then be marshaled by a single data access object (DAO) layer. A data access object (DAO) is an object that provides an abstract interface to some type of database or persistence mechanism, providing some specific operations without exposing details of the database. The DAO provides a mapping from application calls to the persistence layer. This isolation separates the concerns of what data accesses the application needs, in terms of domain-specific objects and data types (the public interface of the DAO), and how these needs can be satisfied with a specific database management system (DBMS), database schema, etc. (e.g., the implementation of the DAO). At the lowest level, a GDTO is created for each record in a database result set or table and a table is then returned as a list of GDTOs. The table metadata is used to provide the keys for the key-value pairs of each GDTO. The GDTO is not limited to the scalar types returned for database fields and can include compound objects as a value in a key-value pair. A GDTO is therefore capable of holding an object graph. Individual values can be retrieved from the GDTO or nested values can be retrieved by a path. Introducing a GDTO approach means that a generic access mechanism can be employed and this facilitates layering of non-functional components, such as security filtering, error handling, database connection handling and encoding. A GDTO also facilitates optimization of the backend communication as the in representation can be enhanced to handle the In-Memory Computing Engine (IMCE) calling mechanism so that tables of inputs can be used rather than just scalar values. The GDTO mechanism allows for a common addressing mechanism and this facilitates lookups for input/output filters and mapping of client-server data structures to server-IMCE data structures such that custom middle tier code can be removed. Several variants of the GDTO are possible to support different usage. For example, the metadata can be optimized so that it is not stored redundantly for tables or regularly structured objects, or a sealable (immutable) variant can also be created to support concurrent operations.

Conventional solutions require a specification of the object types via metadata whereas embodiments described herein leverage the metadata already present in the IMCE system (e.g., the table structures). For example, in the present embodiments, die metadata might be used at design time to create a runtime artifact that is a materialization of this metadata (or an object that the metadata describes). The embodiments described herein also support generic data access that supports interaction and mapping of data without custom coding.

The embodiments described herein can be distinguished from conventional JCACHE. The JCACHE specification standardizes in process caching of Java objects in a way that allows an efficient implementation, and removes from the programmer the burden of implementing cache expiration, mutual exclusion, spooling, and cache consistency. However, JCACHE is a caching mechanism whereas the embodiments described herein simplify and abstract data access, and as such it involves moving and transforming data from one tier to others, while allowing some processing of that data in the process.

Figure 1:
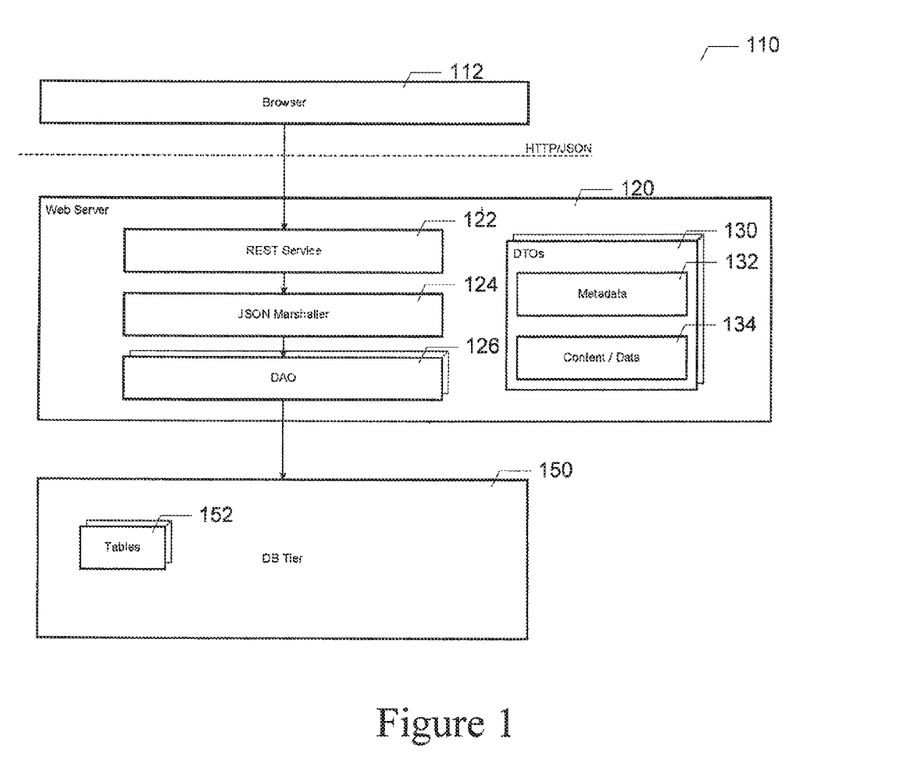
FIG. 1 illustrates a graphical representation of an interface between a browser and a web server wherein a non-generic data access object (DAO) layer is used.

FIG. 1 illustrates a graphical representation 110 of an interface between a browser 112 and a web server 120 wherein a non-generic data access object (DAO) layer is used. As used herein, the term "browser" includes conventional internet browser software, as well as user or client agents, client applications (sometimes denoted as apps), connected services, and other client-side software. Referring to FIG. 1, a browser 112 makes a request to a representational state transfer (REST) service 122 in a web server 120. The request calls through a JavaScript Object Notation (JSON) marshaler 124 and a non-generic data access object (DAO) layer 126 to a database tier 150. Representational state transfer (REST) is a style of software architecture for distributed systems such as the World Wide Web. REST has emerged over the past few years as a predominant Web service design model. REST has increasingly displaced other design models such as Simple Object Access Protocol (SOAP) and Web Services Description Language (WSDL) due to its simpler style. JSON is a lightweight text-based open standard designed for human-readable data interchange.

As a result of processing the request, the DAO layer 126 typically returns data as multiple, custom, non-generic Data Transfer Objects (DTOs—these are usually just data structures), or intermediate representations of the objects—usually so that those objects can be used/manipulated in the web tier 120. However, in an intermediate tier architecture, it is advantageous to avoid such manipulation and the processing of DTOs; because, such manipulations are largely valueless and add processing overhead. Further, the architecture shown in FIG. 1 requires that multiple DAOs be provided at the DAO layer 126.

Figure 2:
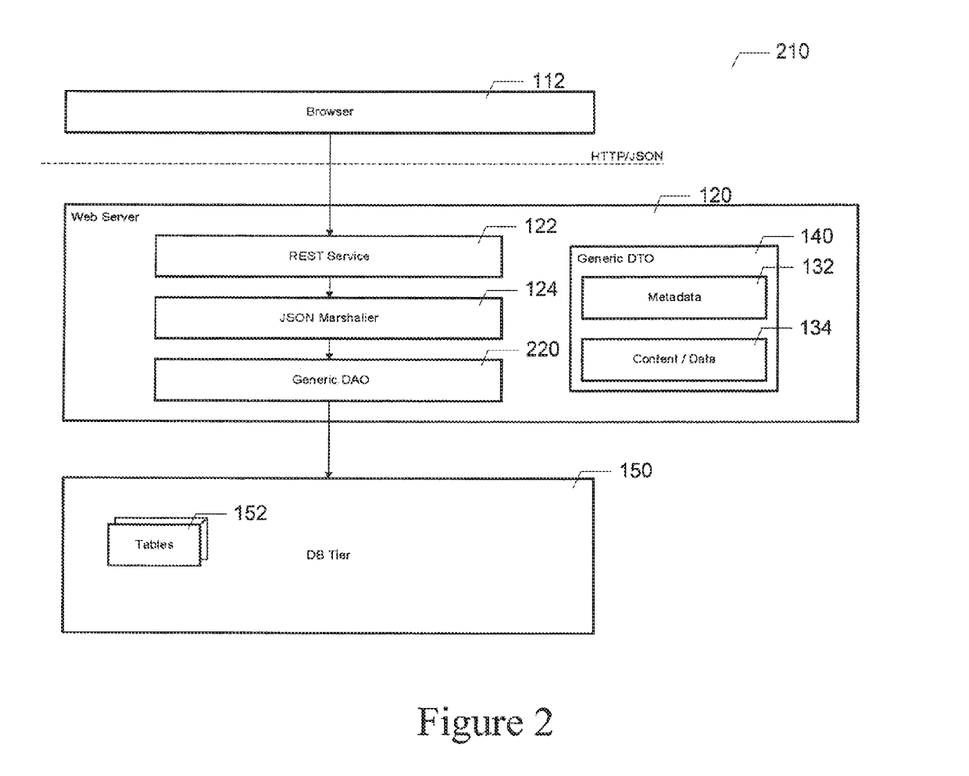
FIG. 2 illustrates a graphical representation of an interface between a browser and a web server wherein a generic data access object (GDAO) layer is used.

FIG. 2 illustrates a graphical representation 210 of an interface between a browser 112 and a web server 120 wherein a generic data access object (GDAO) layer 220 is used. Referring to FIG. 2, configuration for processing a request from the browser 112 is similar to the configuration shown in FIG. 11, except, in this case, the request calls through the JSON marshaler 124 to the database tier 150 via a generic data access object (GDAO) layer 220. The GDAO 220 can generate a single, shared, generic DTO (GDTO) rather than multiple, custom, non-generic DTOs. In addition, the architecture shown in FIG. 2 can use a single GDAO 220 provided at the GDAO layer 220 rather than multiple DAOs 126. In this architecture shown in FIG. 2, the GDAO 220 can call through to the database tier 150 and database-stored procedures, tables, or other functions and use the database metadata (e.g., the table definitions 152) to return the results as generic DTOs (GDTOs).

Figure 3:
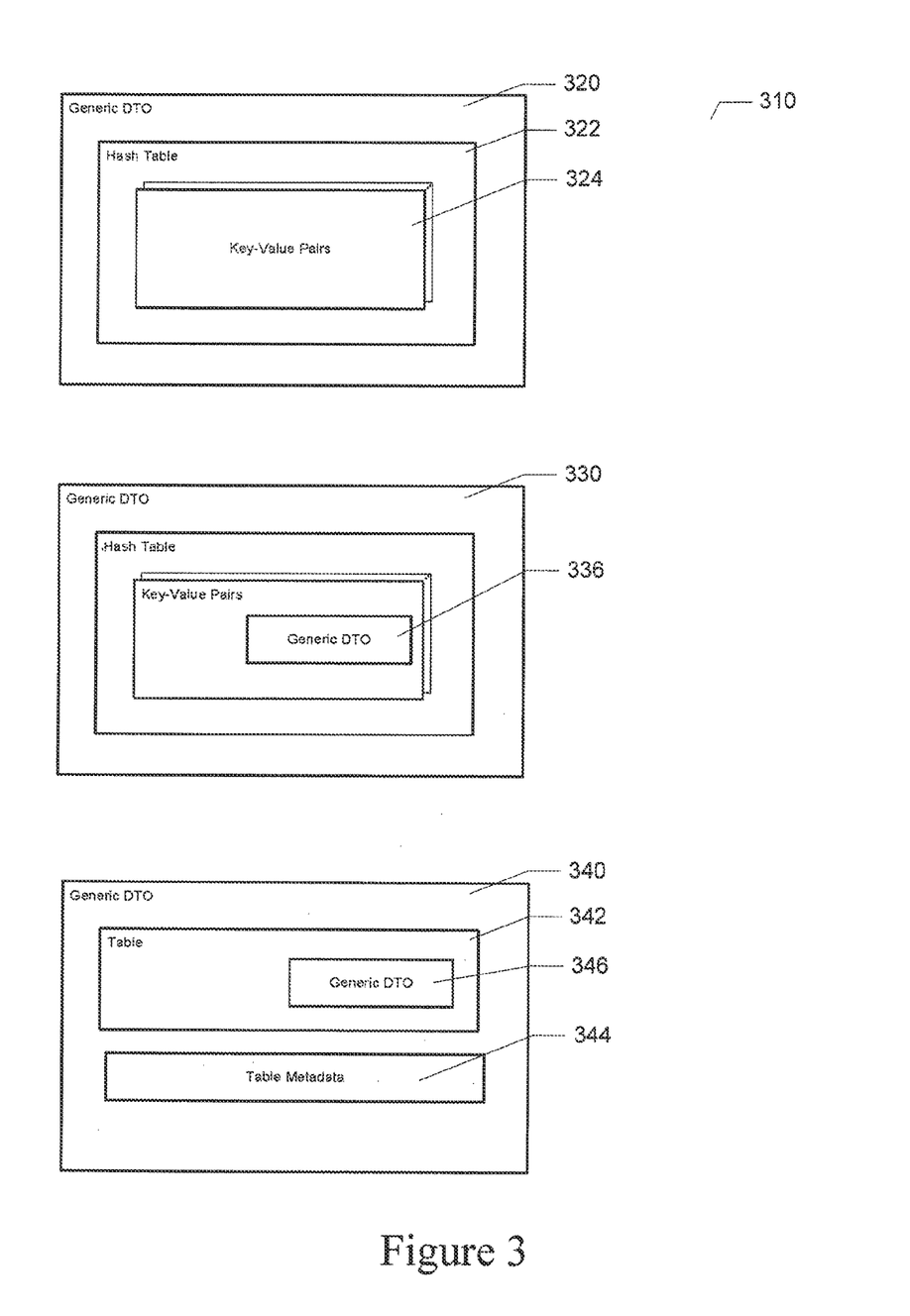
FIG. 3 illustrates a graphical representation of the structure of various forms of a GDTO in an example embodiment.

FIG. 3 illustrates a graphical representation 310 of the structure of various forms of a GDTO in an example embodiment. Referring to FIG. 3, the diagram shows a generic DTO 320 in its simplest form as an object containing a hash table 322 of objects 324. The objects 324 in hash table 322 can be as simple as sets of key-value pairs. The GDTO 320 provides access methods to enable the values of objects 324 to be easily retrieved. The GDTO 320 can also provide other utility functions for accessing or manipulating the objects 324 of hash table 322.

Referring still to FIG. 3, the diagram shows a GDTO 330, which includes a different, nested GDTO 336. In an embodiment, a GDTO 330 can nest other GDTOs 336 at many levels. The top level GDTO 330 can provide access methods to enable access to the fields or values held in the nested GDTOs 336. Additionally, the GDTO 330 can leverage the metadata to expose payload data in a typed fashion (i.e., in accordance with the metadata). For example the GDTO 330 may provide access to a named field in a generic way as a string or object; but the GDTO 330 can also leverage the metadata to return the field as a specific type (e.g., a date type) or to provide proper conversion of the data from one type to another (e.g., a date can be converted to a long type in a semantically correct manner).

Referring still to FIG. 3, the diagram shows a GDTO 340 optimized for managing tables. Where tables are being output, a list of GDTOs can be returned and the structure of each record is represented as a GDTO. This duplicates the metadata (e.g., the field names) in each GDTO. As shown in FIG. 3, the GDTO 340 holds the metadata 344 (e.g., field names, field order etc. . . . ) at the top level and nests GDTOs 346 holding only the field values. The nested GDTO 346 can still reference or share the metadata 344 held in the top level GDTO 340. As a result, a GDTO is capable of holding an object graph. Individual values can be retrieved from the GDTO or nested values can be retrieved by a path.

Figure 4:
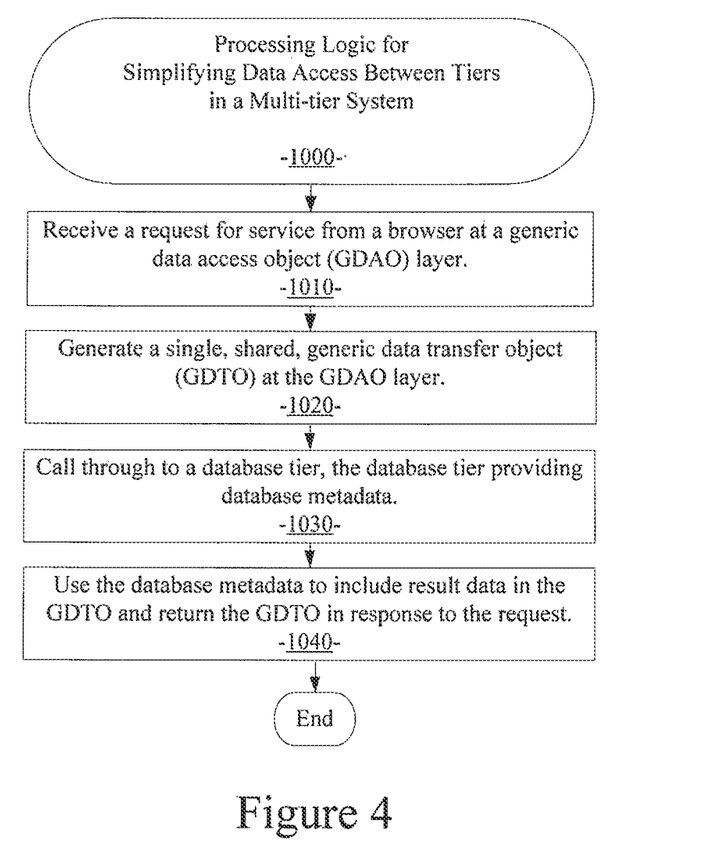
FIG. 4 is a processing flow diagram illustrating an example embodiment of a system and method for simplifying data access between tiers in a multi-tier system as described herein.

FIG. 4 is a processing flow diagram illustrating an example embodiment of a system and method for simplifying data access between tiers in a multi-tier system as described herein. The method of an example embodiment includes: receiving a request for service from a browser at a generic data access object (GDAO) layer (processing block 1010); generating, by use of a data processor, a single, shared, generic data transfer object (GDTO) at the GDAO layer (processing block 1020); calling through to a database tier, the database tier providing database metadata (processing block 1030); and using the database metadata to include result data in the GDTO and return the GDTO in response to the request (processing block 1040).

Figure 5:
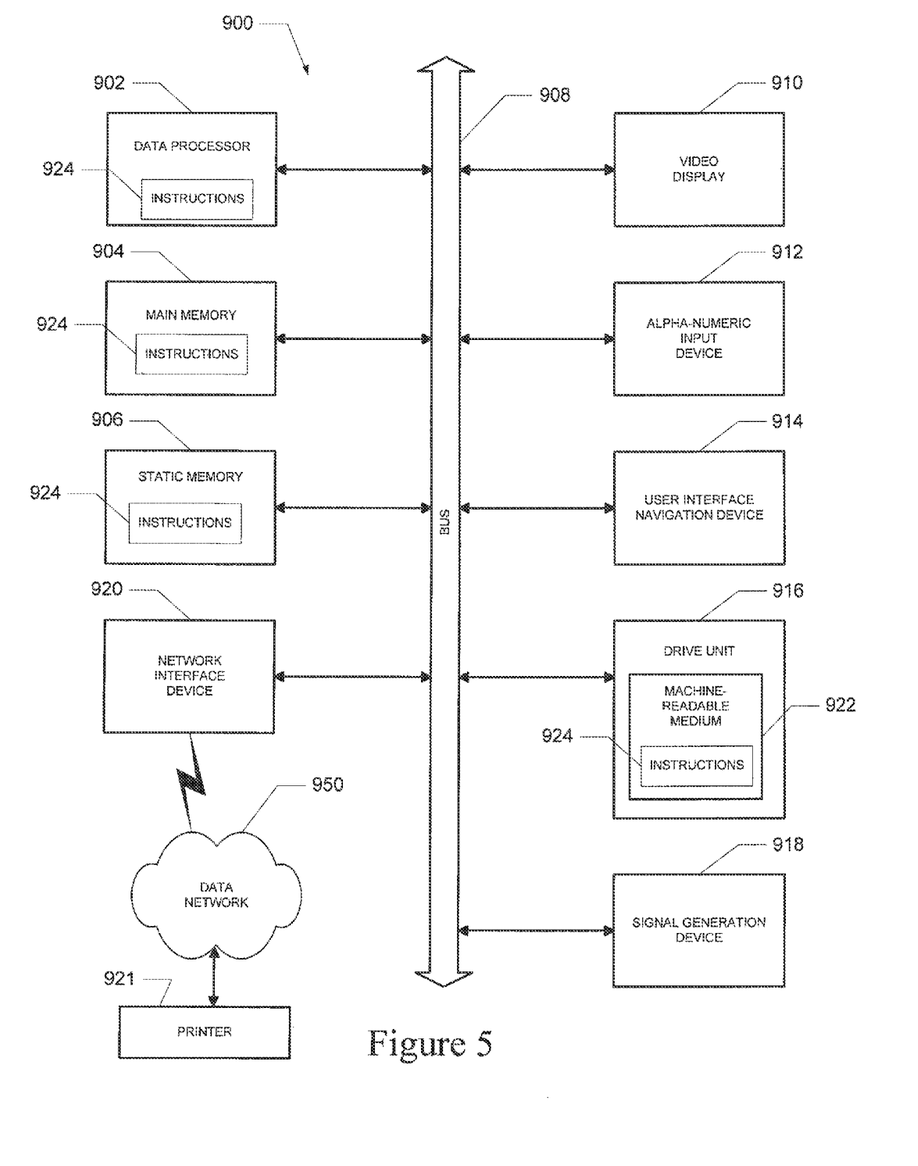
FIG. 5 depicts a block diagram of a machine in the example form of a computing device within which may be executed a set of instructions for causing the machine to perform any one or more of the methodologies disclosed herein.

FIG. 5 depicts a block diagram of a machine in the example form of a computing device 900 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 900 includes a processor 902 (e.g., a central processing unit (CPU), a graphics processing unit (GPU) or both), a main memory 904 (e.g., random access memory), and static memory 906 (e.g., static random-access memory), which communicate with each other via bus 908. The computing device 900 may further include video display unit 910 (e.g., a plasma display, a liquid crystal display (LCD) or a cathode ray tube (CRT)). The computing device 900 also includes an alphanumeric input device 912 (e.g., a keyboard), a user interface (UI) navigation device 914 (e.g., a mouse), a disk drive unit 916, aminal generation device 918 (e.g., a speaker), and a network interface device 920.

The disk drive unit 916 (a type of non-volatile storage) includes a machine-readable medium 922 on which is stored one or more sets of data structures and computer executable instructions 924 (e.g., software) embodying or utilized by any one or more of the methodologies or functions described herein. The data structures and instructions 924 may also reside, completely or at least partially, within the main memory 904 and/or within the processor 902 during execution thereof by computing device 900, with the main memory 904 and processor 902 also constituting machine-readable, tangible media.

The data structures and instructions 924 may further be transmitted or received over a computer network 950 via network interface device 920 utilizing any one of a number of well-known transfer protocols (e.g., HyperText Transfer Protocol (HTTP)). As also depicted FIG. 9, data structures and instructions 924 can be communicated to a printer 921, which is a device that prints renderings of reports on paper.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 900) or one or more hardware modules of a computer system (e.g., a data processor 902 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose data processor 902 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 902 configured using software, the general-purpose data processor 902 may be configured as respective different hardware modules at different times. Software may accordingly configure a data processor 902, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules, in embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more data processors 902 that are temporarily configured (e.g., by software) or permanently configured to perform the relevant operations. Whether temporarily or permanently configured, such data processors 902 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more data processors 902 or processor-implemented modules. The performance of certain of the operations may be distributed among the one or more data processors 902, not only residing within a single machine, but deployed across a number of machines. In some example embodiments, the data processors 902 may be located in a single location (e.g., within a home environment, an office environment or as a server farm), while in other embodiments the data processors 902 may be distributed across a number of locations.

While the embodiment(s) is (are) described with reference to various implementations and exploitations, it will be understood that these embodiments are illustrative and that the scope of the embodiment(s) is not limited to them. In general, techniques providing feedback regarding validity of data referenced in a report may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method comprising:
generating, by use of a data processor, a single, shared, generic data transfer object (GDTO) at a GDAO layer, wherein the GDTO is a data structure having a format that is capable of having stored therein any of multiple data types, the GDTO including content of a first content type and one or more access methods defining procedures to access the first content type:

receiving a request for service from a browser at the generic data access object (GDAO) layer;

calling through to a database tier to retrieve a database record responsive to the request for service, the database tier providing database metadata;

adding content of a second content type from the database record to the GDTO;

creating one or more access methods defining procedures to access the second content type based on the database metadata;

storing in the GDTO the one or more access methods defining procedures to access the second content type based on the database metadata, thus resulting in the content of a first content type, the one or more access methods defining procedures to access the first content type, the content of a second content type, and the one or more access methods defining procedures to access the second content type all being stored in the same data structure; and returning the GDTO, including the content of a first content type, the one or more access methods defining procedures to access the first content type, the content of a second content type, and the one or more procedures defining procedures to access the second content type, to the browser in response to the request, allowing the browser to access a selected one of any of the content of a first content type and content of a second content type using the one or more access methods defining procedures to access the content type of the selected content from the GDTO, and thus converting the content type of the selected content into a content type readable by the browser.

2. The method of claim 1, wherein the GDTO includes a hash table.

3. The method of claim 2, wherein the GDTO includes a set of key-value pairs.

4. The method of claim 3, wherein the GDTO includes a nested GDTO.

5. The method of claim 1, wherein the GDTO includes a table and table metadata.

6. The method of claim 5, wherein the GDTO includes a nested GDTO.

7. The method of claim 1, wherein a single GDAO is provided at the GDAO layer.

8. The method of claim 2, wherein the GDTO provides utility functions for accessing or manipulating objects of the hash table.

9. The method of claim 4, wherein the GDTO provides utility functions for accessing or manipulating values of the nested GDTO.

10. A non-transitory, machine-readable storage medium that stores instructions, which, when performed by a machine, cause the machine to perform operations comprising:

generating by use of a data processor, a single, shared, generic data transfer object (GDTO) at a GDAO layer, wherein the GDTO is a data structure having a format that is capable of having stored therein any of multiple data types, the GDTO including content of a first content type and one or more access methods defining procedures to access the first content type;

receiving a request for service from a browser at the generic data access object (GDAO) layer;

calling through to a database tier to retrieve a database record responsive to the request for service, the database tier providing database metadata;

adding content of a second content type from the database record to the GDTO;

creating one or more access methods defining procedures to access the second content type based on the database metadata;

storing in the GDTO the one or more access methods defining procedures to access the second content type based on the database metadata, thus resulting in the content of a first content type, the one or more access methods defining procedures to access the first content type, the content of a second content type, and the one or more access methods defining procedures to access the second content type all being stored in the same data structure; and returning the GDTO, including the content of a first content type, the one or more access methods defining procedures to access the first content type, the content of a second content type, and the one or more procedures defining procedures to access the second content type, to the browser in response to the request, allowing the browser to access a selected one of any of the content of a first content type and content of a second content type using the one or more access methods defining procedures to access the content type of the selected content from the GDTO, and thus converting the content type of the selected content into a content type readable by the browse.

11. The machine-readable storage medium of claim 10, wherein the GDTO in hash table.

12. The machine-readable storage medium of claim 11, wherein the GDTO includes a set of key-value pairs.

13. The machine-readable storage medium of claim 12, wherein the GDTO includes a nested GDTO.

14. The machine-readable storage medium of claim 10, wherein the GDTO includes a table and table metadata.

15. The machine-readable storage medium of claim 14, wherein the GDTO includes a nested GDTO.

16. The machine-readable storage medium of claim 10, wherein a single GDAO is provided at the GDAO layer.

17. The machine-readable storage medium of claim 11, wherein GDTO provides utility functions for accessing or manipulating objects of the hash table.

18. The machine-readable storage medium of claim 13, wherein the GDTO provides utility functions for accessing or manipulating values of the nested GDTO.

19. A system comprising:
a client tier;
a database tier; and
a web tier in data communication with the client tier and the database tier, the web tier including processing modules to:

generate, by use of a data processor, a single, shared, generic data transfer object (GDTO) at a GDAO layer, wherein the GDTO is a data structure having a format that is capable of having stored therein any of multiple data types, the GDTO including content of a first content type and one or more access methods defining procedures to access the first content type;

receive a request for service from a browser at the generic data access object (GDAO) layer;

call through to a database tier to retrieve a database record responsive to the request for service, the database tier providing database metadata;

add content of a second content type from the database record to the GDTO;

create one or more access methods defining procedures to access the second content type based on the database metadata;

store in the GDTO the one or more access methods defining procedures to access the second content type based on the database metadata, thus resulting in the content of a first content type, the one or more access methods defining procedures to access the first content type, the content of a second content type, and the one or more access methods defining procedures to access the second content type all being stored in the same data structure; and return the GDTO, including the content of a first content type, the one or more access methods defining procedures to access the first content type, the content of a second content type, and the one or more access procedures defining procedures to access the second content type, to the browser in response to the request, allowing the browser to access a selected one of any of the content of a first content type and content of a second content type using the one or more access methods defining procedures to access the content type of the selected content from the GDTO, and thus converting the content type of the selected content into a content type readable by the browser.

20. The system of claim 19, wherein the GDTO includes a hash table and a set of key-value pairs.

* * * * *